Jan. 17, 1961   T. C. EVANS ET AL   2,968,601
FUEL ELEMENT FOR NEUTRONIC REACTORS
Filed Dec. 10, 1957   2 Sheets-Sheet 1

INVENTORS
Ermer G. Beasley, Jr.
Thomas C. Evans
BY

ATTORNEY

Jan. 17, 1961 T. C. EVANS ET AL 2,968,601
FUEL ELEMENT FOR NEUTRONIC REACTORS
Filed Dec. 10, 1957 2 Sheets-Sheet 2

INVENTORS.
Ermer G. Beasley, Jr.
BY  Thomas C. Evans

ATTORNEY

United States Patent Office 2,968,601
Patented Jan. 17, 1961

2,968,601

FUEL ELEMENT FOR NEUTRONIC REACTORS

Thomas C. Evans, Grundy Center, Iowa, and Ermer G. Beasley, Jr., Arlington, Va., assignors to the United States of America as represented by the United States Atomic Energy Commission Filed Dec. 10, 1957, Ser. No. 701,947

2 Claims. (Cl. 204—193.2)

Our invention relates generally to the neutronic reactor art and more particularly to a novel internally cooled fuel element for neutronic reactors.

In the neutronic reactor art, gas-cooled, natural-uranium-fueled power reactors have been subordinated in this country in favor of liquid-cooled reactors fueled with uranium enriched in the $U^{235}$ isotope. This approach to economical nuclear power has been due primarily to the availability of enriched uranium from the gaseous diffusion plants of this country and to several inherent disadvantages of the gas-cooled natural-uranium-fueled system. In general, gases have very inferior heat transfer and capacitive characteristics in comparison to liquids; therefore, in a gas-cooled reactor, the coolant occupies a much larger volume in the active portion of that reactor than the liquid coolant in a comparable liquid-cooled installation of the same generating capacity. Consequently, the gas-cooled reactor is costly because the amount of fissionable fuel required for criticality and the amount of supporting structural material must be large relative to similar liquid-cooled reactors in order to accommodate the larger volume of gaseous coolant.

The disadvantage of poor heat transfer characteristics in gases is, however, partially diminished by the higher upper temperature limit of the gases. If the upper temperature limit is sufficiently high, specific powers of gas cooled reactors can approach the specific powers obtained in liquid-cooled reactors. The highest temperature at which liquids can be used as coolants is determined primarily by the vapor pressure associated with the coolant at that temperature and by corrosion resistance of the reactor structural materials which are exposed to the coolant. Water, the prevalent coolant today, is severely restricted to relatively low temperatures because of its high vapor pressure at these temperatures. Liquid metals and fused salts, which are now under extensive investigation, have allowed operation at high temperature but these coolants have generally imposed restrictions upon the selection of structural materials and have increased the cost of power reactor installations because of the safety precautions which must be exercised in association with their use. For example, sodium is catastrophically reactive with water and air at elevated temperatures. These hazards can be minimized greatly as evidenced by the use of sodium and sodium-potassium mixtures in several operating reactors, but the reduction of hazards has been accomplished only at great expense. Inert gases, however, are available for use as reactor coolants and although they may be relatively expensive initially, the high initial cost of these gases is justified if, by their use, reactors can be designed which have specific powers comparable to the liquid-cooled reactor system.

If natural uranium is used as a fuel, the moderator must be judiciously selected in order to obtain the highest excess reactivity available at the lowest cost. Graphite and heavy water ($D_2O$) have been used widely as moderators in natural uranium reactors and heavy water is decisively the better moderator of the two materials. It is, therefore, desirable to incorporate heavy water in reactors fueled with natural uranium in order to obtain a larger amount of excess reactivity than would be afforded by a graphite moderator reactor of the same physical size.

Superficially, it appears that the combination of a gas coolant at high temperatures and heavy water as a moderator would be the logical and desired means of deriving economic nuclear power from natural uranium-fueled reactors. Unfortunately, these two advantages have been, heretofore, unobtainable simultaneously because high temperatures in the coolant have heretofore resulted in high moderator temperatures. Consequently, the advantages derived from the use of a high temperature gas and from heavy water simultaneously have been negated by increased structural costs necessitated by the high pressures associated with heavy water at high temperatures.

It is, therefore, an object of our invention to provide a novel fuel element for use in gas-cooled neutronic reactors, whereby these reactors can be operated at relatively high specific powers.

Another object of our invention is to provide a novel fuel element for use in gas-cooled neutronic reactors whereby these reactors can be operated at high coolant outlet temperatures and low moderator temperatures simultaneously.

Another object of our invention is to provide a novel fuel element for use in gas-cooled neutronic reactors, whereby the moderator temperatures in these reactors can be maintained at essentially the coolant inlet temperature.

A still further object of our invention is to provide a novel fuel element for gas-cooled neutronic reactors, whereby the coolant volume in these reactors is minimized.

These and other objects of our invention will become apparent to those skilled in the art from the following detailed description of our invention when taken in conjunction with the accompanying drawings wherein.

In accordance with our invention, we provide a novel fuel assembly adapted to be cooled internally by a coolant stream. The fuel assembly comprises a fissionable fuel bearing plate which is rolled in one direction to form a cylindrical spiral having a central channel coaxial with the cylinder. We further provide means to introduce a relatively cold coolant tangentially into the spiral passageway which is defined by the rolled plate, means to completely seal or close one end of the cylinder, and means to seal or close the opposite end of the cylinder partially, the central channel being left unclosed. The central channel, which is open at one end of the cylinder, serves, therefore, as an exit channel for the hot coolant after the coolant has traversed the spiral passageway. It will be apparent that the moderator used in reactors utilizing the fuel element which we provide is never in contact with coolants having a temperature higher than the inlet coolant temperature and that the outlet temperature of the coolant is limited only by the properties of the material used in the fabrication of the fuel plate.

Our novel fuel element can be incorporated into all types of heterogeneous reactors; however, the advantages derived from its use are greatest in magnitude in gas-cooled applications wherein it is desired to maintain low moderator temperatures. The advantages of our invention are still more striking when it is used in gas-cooled, natural-uranium-fueled reactors, as will be apparent from our description below of a reactor designed to use one embodiment of our fuel element.

Any fissionable fuel composition is suitable for use in the fuel bearing plate of the fuel element which we provide. However, $U^{235}$ diluted with $U^{238}$ is generally preferred as the fissionable fuel and more particularly, natural uranium (i.e., non-enriched in the $U^{235}$ isotope) is preferred.

Any non-neutron absorbing structural material having sufficient mechanical strength to undergo fabrication into the spiral shape which we provide may be used in any convenient manner to protect the fissionable fuel used in the fuel plate. It is, however, preferable to use high melting, chemically resistant materials, which are metallurgically compatible with uranium, as a structural material. We provide a "sandwich-type" fuel plate comprising natural uranium clad with zirconium for use in the specific embodiment described below.

Figure 1:
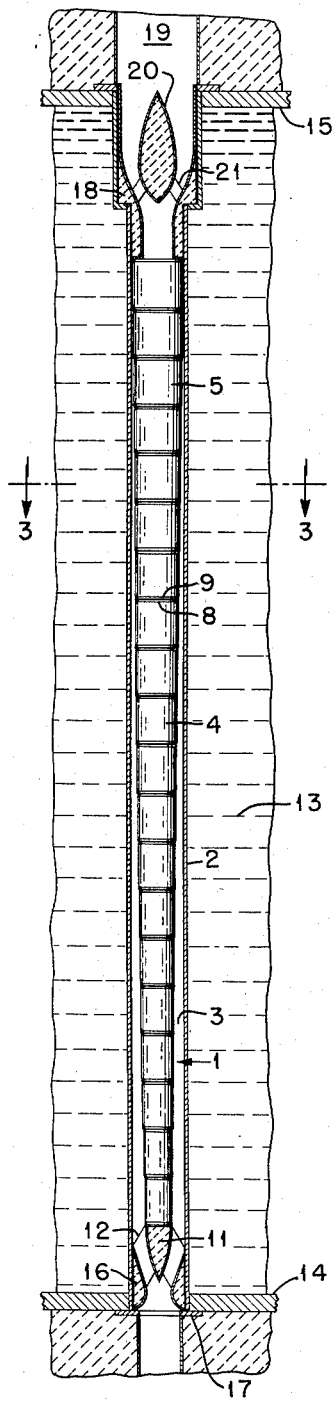
Fig. 1 is a partial vertical section of a fuel element assembly including a fuel element designed to fulfill the aforesaid objects.

Referring now to Fig. 1, which is a partial vertical section of one reactor embodiment utilizing our invention, a composite fuel element 1 is shown enclosed by an aluminum tube 2, thereby providing a coolant inlet annulus 3. The composite fuel element 1 as shown in this particular embodiment, comprises twenty stacked individual fuel element sections such as 4 and 5. A more detailed view of one such individual fuel element section is shown in Fig. 2.

Figure 2:
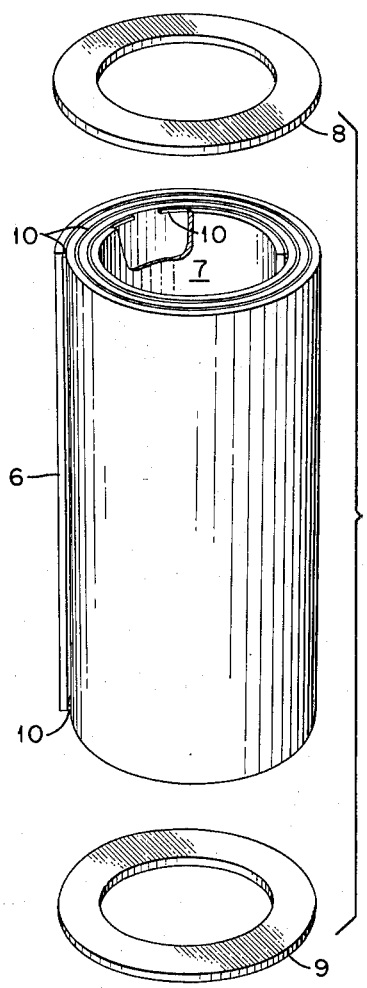
Fig. 2 is a more detailed view of a fuel element section in that reactor.

Referring now to Fig. 2, it can be seen that each individual fuel element section is composed of a flat plate rolled in one direction to form a cylindrical spiral 6, having a central channel 7, and two centrally apertured end plates 8 and 9. The cylindrical spiral may be fabricated in any convenient manner, but we have found it preferable to tightly roll a flat fuel plate having spacers attached to the edges which will ultimately become the ends of the cylinder. In this specific embodiment natural uranium is clad with zirconium by the technique described in "Bonding of Uranium to Zirconium by Roll-Cladding," AEC Report TID–5084, page 53, March 1952. The spacers 10 which are square zirconium wires, are attached by welding to the long edges of a flat plate one foot wide and six feet long and rolled in the long direction to form a spiral having a spiral passageway equal in width to the thickness of the spacer 10. The centrally apertured end plates 8 and 9 are fabricated from zirconium and are welded to the outside turn of the fuel spiral leaving the other turns free to expand or contract under thermal cycling.

Reverting now to Fig. 1, the composite fuel element 1 is assembled by stacking coaxially twenty fuel element sections of the type shown in Fig. 2, and welding the end plates of adjoining sections together. The composite fuel element has, by virtue of the central apertures in the end plates, a central channel running its entire length. A graphite plug 11, having supporting fins 12 attached thereto, is provided to close the entire inlet end of the composite fuel element 1. A moderator, heavy water 13 in this particular reactor, completely surrounds the entire fuel assembly including the aluminum tube 2. The tube 2 is rigidly attached and supported at the inlet and outlet ends by the tube sheets 14 and 15, and the composite fuel element 1 is supported at the inlet or lower end by fins 12 which rest on a venturi-shaped graphite insert 16. The insert 16 is supported by a centrally apertured washer 17 which is welded directly to the lower tube sheet. At the outlet or upper end of the composite fuel element 1, a graphite stopper 18, which fits snugly into the upper end of tube 2, is provided to close the upper or outlet end of the annulus 3 and maintain the composite fuel element coaxial with the tube 2. The composite fuel element 1 is thereby rendered removable through the top of the reactor. Stopper 18 is centrally apertured, thereby sealing the annulus tube 2 while leaving the central channel of the composite fuel element in communication with exterior of the reactor, through channel 19 which has a reflector plug 20 inserted therein. Plug 20 is rigidly maintained within the outlet channel by fins 21. The top and bottom of the reactor are surrounded by two feet of graphite, which serves as a reflector, and by appropriate shielding of concrete and steel.

In operation helium is introduced at the bottom of the composite fuel element 1 from an exterior heat exchanger, through a tortuous channel in the shielding and reflector, into the annulus 3. Helium then tangentially enters the spiral passageways of the individual fuel element sections 1 where the flow is maintained in a tangential direction by the end plates, such as 8 and 9, which are welded between each individual fuel element. The coolant is heated within the spiral passageways 1 reaching a maximum temperature at the central channel. The heated coolant then passes up the central channel and emerges from the reactor through passageways in the reflector and shield.

In this particular embodiment, as is apparent from Fig. 1, we have provided a composite fuel element which varies in diameter from a minimum at the inlet end to a maximum at the outlet end, thereby providing an annulus 3 which varies from a maximum at the inlet to a minimum at the outlet. The spacing between turns of the spiral remains constant throughout the length of the fuel unit; therefore, the central channel varies in diameter from a minimum at the inlet end to a maximum at the outlet. This feature provides a maximum annulus volume at the inlet where the cool inlet stream is of the greatest volume and simultaneously provides a maximum volume in the central channel at the outlet end of the fuel unit where the volume of hot coolant is the greatest. Pressure variation within the fuel assemblies is, therefore, held at a minimum. In order to vary the diameter of the composite fuel element, the twenty stacked fuel element sections each have a different diameter. The rate of change of fuel unit diameter is a variable which is dependent upon flow conditions and must be selected for each reactor embodiment. Table I below summarizes the critical dimensions of the particular fuel element embodiment shown in Fig. 1.

*Table I*

| | |
|---|---:|
| Length of composite fuel element _____feet__ | 20 |
| Number of individual fuel element sections/composite fuel element _____ | 20 |
| Height of individual fuel element section __inches__ | 12 |
| Height of uranium in individual fuel element section _____do____ | 11.3 |
| Cladding thickness _____do____ | 0.005 |
| Fuel thickness _____do____ | 0.087 |
| Total length of spiral _____do____ | 73.2 |
| Spacing between spirals _____do____ | 0.08 |
| Inside spiral diameter (inlet section) _____do____ | 3.10 |
| Inside spiral diameter (central section) __do____ | 4.13 |
| Inside spiral diameter (outlet section) ___do____ | 5.16 |
| Outside spiral diameter (inlet section) ___do____ | 4.64 |
| Outside spiral diameter (central section) __do____ | 5.67 |
| Outside spiral diameter (outlet section) __do____ | 6.70 |
| Process tube inside diameter _____do____ | 6.8 |
| Process tube thickness _____do____ | 0.16 |

Figure 3:
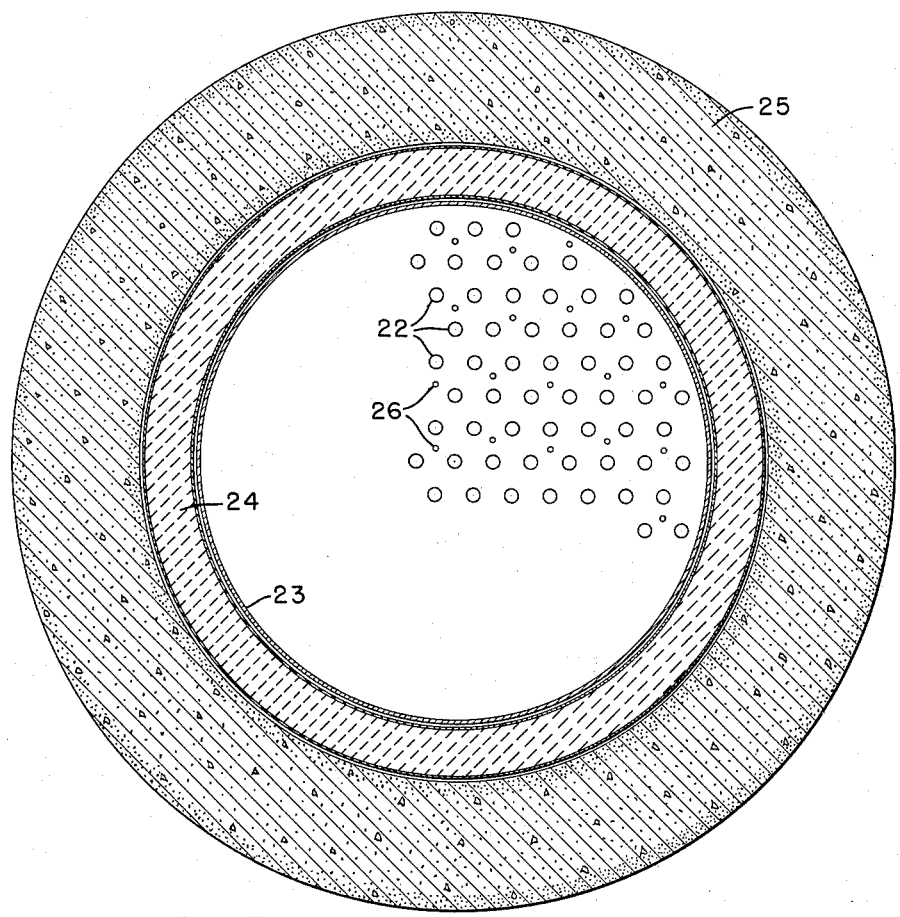
Fig. 3 is a horizontal cross section of the reactor taken along section line 3—3.

Referring now to Fig. 3, which is a horizontal cross section of the reactor taken along section line 3—3 of Fig. 1, 151 composite fuel elements 22 of the type shown in Fig. 1 are uniformly distributed across the reactor core and immersed completely in heavy water contained in the cylindrical tank 23. Tank 23 is a cylinder twenty feet in diameter and twenty feet high. A two-foot-wide layer of graphite 24 completely encloses tank 23 and is surrounded in turn by six feet of concrete 25. Sixty-two conventional aluminum-clad control rods containing cadmium 26 are uniformly distributed across the reactor. These rods are driven by standard control rod drives and regulated by conventional instrumentation. Each rod has an effective radius of two centimeters and all rods acting together are capable of holding out a $k$ effective of 0.25. While we have shown a constant lattice spacing and uniform control rod distribution in Fig. 3, it is entirely within the scope of our invention to modify the lattice spacing to vary the neutron flux as desired. Table II below summarizes the design of the reactor described herein.

*Table II*

Power level:
- Heat output _____ 1000 mw.
- Electrical output _____ 214 mw.

Moderator _____ Heavy water.
Coolant _____ Helium.
Clad _____ Zirconium.
Structure _____ Aluminum.
Reflector _____ Graphite.
Fuel _____ Natural uranium.
- Number of composite fuel elements _____ 151.

Size:
- Core radius _____ 10 feet.
- Height _____ 20 feet.
- Reflector thickness _____ 2 feet.

Core composition:
- Natural uranium _____ 74 tons.
- Zirconium _____ 5.4 tons.
- Aluminum _____ 5.6 tons.
- $D_2O$ (@ 20° C.) _____ 171 tons.

Nuclear parameters (clean hot reactor):
- $\eta$ _____ 1.33.
- $\epsilon$ _____ 1.032.
- $p$ _____ .9363.
- $f$ _____ .9655.
- $k$ _____ 1.241.
- $1/(1+M^2B^2)$ _____ .9411.
- $k_{\text{eff}}$ _____ 1.168.
- Reflector savings _____ 1.11%.
- Conversion ratio _____ 0.70.
- Endurance _____ 6000 mw.d./ton of natural uranium.
- Flux (average thermal) _____ $6.2 \times 10^{13}$ neutron-cm./cm.$^3$-sec.

Temperature coefficients:
- Prompt _____ $-0.93 \times 10^{-5}/°$ C.
- Delayed _____ $-19.07 \times 10^{-5}/°$ C.

Heat transfer parameters:
- Coolant—
  - Inlet temperature _____ 350° F.
  - Outlet temperature _____ 1000° F.
  - Inlet pressure _____ 498 p.s.i.a.
  - Outlet pressure _____ 464 p.s.i.a.
  - Minimum spiral velocity (at core center) _____ 308 ft./sec.
  - Maximum spiral velocity (at core center) _____ 585 ft./sec.
- Fuel—
  - Maximum fuel temperature _____ 1112° F.
  - Fuel temperature at surface (max.) _____ 1096° F.

Average moderator temperature _____ 350° F.

Pressure drop:
- Core _____ 34 p.s.i.
- Over-all _____ 44 p.s.i.

An inspection of Table II reveals that we have provided a gas-cooled, natural-uranium-fueled reactor which has a specific power of 13.5 megawatts per ton, which is about three times the specific power of the British Calder Hall reactor, and approaches the specific powers of liquid-cooled reactors. In addition we have maintained the moderator temperature at essentially the inlet gas temperature and have provided means to heat the outlet gas approximately 700° F.

The hot coolant which emerges from the reactor may be circulated through any convenient power cycle to extract the energy imparted by the fissioning fuel within the reactor. Since some heat must be removed from the moderator, the moderator may be circulated to an external heat exchanger in the power cycle which is used. Also, it is necessary to provide a recombiner to recombine deterium and oxygen which are formed under a neutron flux. Reference is made to "The Reactor Handbook," volumes 1–3, AECD 3647, March 1955. Details of suitable auxiliary systems for the reactor active portion described herein are set forth in these volumes.

Although the particular embodiment of our invention which is described herein is fueled by natural uranium, it is entirely possible to use enriched uranium in the fuel units such as are shown in Fig. 1. By doing so, our invention can be adapted to existing reactors if means for coolant introduction and withdrawal are provided. For example, our novel fuel element can be incorporated into the Oak Ridge Graphite Reactor, and heavy water moderated reactors such as the CP reactor series at the Argonne National Laboratory if proper structural changes are made.

Many changes and modifications from the embodiment described above may be made within the scope of our invention. For example; moderators other than heavy water may be used in association with our fuel element; the composite fuel element may be fabricated from any convenient number of individual fuel element sections and made to any convenient length; gaseous coolants other than helium, such as $CO_2$, and even liquid coolants may be used; enriched uranium may be used in the fuel plates, mechanical equivalents of the end plates which we provide may be substituted; and, in general, structural materials may be modified as needed in other embodiments of our invention. Our invention should not be limited by the above illustrative example but should be limited only as indicated in the appended claims in the light of our description contained herein.

Having thus described our invention, we claim:

1. A fuel element section comprising a fissionable clad fuel-bearing plate disposed in the form of a multi-turn spiral, the first turn of which is radially spaced from a longitudinal axis and the remaining turns of which are relatively closely wound about said first turn, the ends of said plate thus being linearly disposed substantially parallel to said axis and the edges of said plate thus being spirally disposed in planes substantially perpendicular to said axis, each of said spirally-disposed edges being provided with a centrally apertured cover plate affixed in fluid tight relationship, thus providing said fuel element with the approximate form of a hollow cylinder and with a spirally-formed fluid passageway between the axial aperture thus defined and the exterior of said fuel element.

2. A fuel assembly for a nuclear reactor comprising a tube, and disposed in said tube a fuel element comprising a plurality of flat, clad, fuel bearing plates, each plate rolled to form a cylindrical spiral with adjacent turns of said spiral spaced from each other, and having a central axial channel, and centrally apertured end plates closing opposite ends of said spiral except for said central axial channel, joined end-to-end to form a columnar shaped composite fuel element having spiral passageways from the radial surface of the fuel element to a central passageway axial of said element, and end plugs disposed at one end of said fuel element closing said central passageway and means to seal the fuel element to the tube at the opposite end.

References Cited in the file of this patent

UNITED STATES PATENTS 2,782,158  Wheeler _____ Feb. 19, 1957

FOREIGN PATENTS 999,330  France _____ July 16, 1952